(12) United States Patent
Kalender et al.

(10) Patent No.: US 9,081,091 B2
(45) Date of Patent: Jul. 14, 2015

(54) METHOD AND DEVICE FOR TRACKING THE PATH OF MOTION OF A MOVING OBJECT AS WELL AS COMPUTER PROGRAM AND DATA STORAGE MEDIA

(75) Inventors: Carolyn Kalender, Sulzemoos (DE); Alfred Schoettl, Munich (DE)

(73) Assignee: LFK-Lenkflugkoerpersysteme GmbH, Schrobenhausen (DE)

( * ) Notice: Subject to any disclaimer, the term of this patent is extended or adjusted under 35 U.S.C. 154(b) by 1023 days.

(21) Appl. No.: 13/099,181

(22) Filed: May 2, 2011

(65) Prior Publication Data

US 2011/0270592 A1 Nov. 3, 2011

(30) Foreign Application Priority Data

May 3, 2010 (DE) .......................... 10 2010 019 147

(51) Int. Cl.
*G06F 17/10* (2006.01)
*G01S 13/72* (2006.01)
(52) U.S. Cl.
CPC .................................... *G01S 13/723* (2013.01)
(58) Field of Classification Search
CPC ...................................................... G01S 13/723
See application file for complete search history.

(56) References Cited

U.S. PATENT DOCUMENTS

2009/0048811 A1* 2/2009 Kronhamn ........................ 703/2

FOREIGN PATENT DOCUMENTS

DE 100 62 120 6/2002

OTHER PUBLICATIONS

Cao, Yanzhao, Bin Wu, and Yuesheng Xu. "A Fast Collocation Method for Solving Stochastic Integral Equations." SIAM Journal on Numerical Analysis 47.5 (2009): 3744-3767.*
Zhang et al., *Grid Based Solution of Zakai Equation with Adaptive Local Refinement for Bearings-only Tracking*, IEEE Aerospace Conference 2008, pp. 1-8.

(Continued)

*Primary Examiner* — John Q Nguyen
*Assistant Examiner* — Alan D Hutchinson
(74) *Attorney, Agent, or Firm* — Greenblum & Bernstein, P.L.C.

(57) ABSTRACT

Method, device, computer program and computer program product for tracking the path of motion of a moving object. The method includes a) providing data of at least one state variable to be determined, which influences the movement of the moving object, at a first point in time; b) initializing the probability density (p) of the at least one state variable to be determined at the first point in time; c) predicting of the probability density (p) of the at least one state variable to be determined at a next point in time after the first point in time; d) verifying of whether measurement data are available that can be used for a calculation of the probability density (p) of the at least one state variable to be determined, and d') recalculating the probability density (p) with these measurement data when such data is available; e) calculating the prediction values of the state variable(s) to be determined from the probability density (p); f) outputting the calculated prediction values to a downstream data processing device; and g) repeating the steps c) through f). The steps of initializing the probability density (p) of step b); predicting the probability density (p) of step c); recalculating the probability density (p) of step d'); and calculating the prediction values of step e) are performed by discretizing the probability density (p) on sparse grids.

16 Claims, 3 Drawing Sheets

(56) References Cited

OTHER PUBLICATIONS

Zenger, Sparse Grids, in W. Hackbusch (ed.): *Parallel Algorithms for Partial Differential Equations*, Braunschweig: Vieweg, 1991 (Notes on fluid mechanics 31), pp. 241-251.

Zhang et al., *Approximation of Zakai Equation by Grid Based Method*, Vortragsfoien, Workshop on Multi-target tracking, Bordeaux, France, May 13-15, 2009, http://www.math.u-brodeaux.fr/~fcaron/Docs/mttworkshop-zhang.pdf.

* cited by examiner

METHOD AND DEVICE FOR TRACKING THE PATH OF MOTION OF A MOVING OBJECT AS WELL AS COMPUTER PROGRAM AND DATA STORAGE MEDIA

CROSS-REFERENCE TO RELATED APPLICATIONS

The present application claims priority under 35 U.S.C. §119 of German Patent Application No. 10 2010 019 147.7, filed on May 3, 2010, the disclosure of which is expressly incorporated by reference herein in its entirety.

BACKGROUND OF THE INVENTION

1. Field of the Invention

The present invention relates to a method and a device for tracking the path of motion of a moving object according to the preamble of claim 1. It further relates to a computer program that implements this method as well as to a data storage medium with a computer program of this type.

2. Discussion of Background Information

Methods of this type, which are referred to in general as "tracking" methods, are generally known and are described, for example, in the literature reference Zhang, H.; Laneuville, D.: *Grid Based Solution of Zakai Equation with Adaptive Local Refinement for Bearings-only Tracking*, IEEE Aerospace Conference 2008, pages 1 through 8. Such known methods are used, for example, to be able to determine the path of motion of missiles with a relatively high degree of accuracy and to predict the movement of the missile even if only few and possibly faulty localizations of the missile are available. Localizations of this type can be carried out, for example, by radar measurements by one or more measuring devices.

Using all available measurement data from such localizations of the object up to a current point in time, first of all the current position of the object must be determined. As far as possible this should be carried out in real time or quasi-real time, since it is necessary, for example, for engagement of an approaching missile, to know at least the current position of the missile and possibly even to predict the further path of motion of the missile.

In addition to the position of the object, for example, of a missile, as a rule other state variables, such as, for example, the speed vector or parameters of maneuver models, like the ballistic coefficient, are also of interest, since an approaching missile does not move along a linear path of motion at uniform speed, but in general is controlled such that it flies tactical maneuvers.

Furthermore, it can also be necessary to determine estimates of the state variables (including the position data) of the object for past points in time (so-called smoothing) or for future points in time (so-called prediction). It can also be desirable to be able to process measurements that are not available until later, that is, not in real time (so-called latency times).

If the object described a linear movement or if the state variables of the object changed in a linear manner, with normally distributed start distribution and normally distributed measurement errors, a calculation could be made with relatively little expenditure by Kalman filters. However, in practice, the states of the object change in a non-linear manner. For example, in a diversionary maneuver a missile can slow down, accelerate or abruptly change direction, so that determining a path with a Kalman filter is not possible or possible only very inaccurately. Accordingly, if, as in practice, the movements and other state variables of the moving object of interest are to be described by non-linear equations, an optimum determination of the estimate in a closed form is often not possible.

The problem can now be described in the form of stochastic differential equations for the in general multi-dimensional system state variable $X_t$, and the in general multi-dimensional measurement $Y_t$ $$dX_t = f(t, X_t)dt + \sigma(t, X_t)dW_t$$

$$dY_t = g(t, X_t)dt + v(t, X_t)dV_t$$

f, g, $\sigma$, v are thereby suitable functions and W and V are two Brownian motions, which illustrate the noise of the system and measurement respectively. $X_t$ thereby describes the complete state of the motion at the point in time t, thus contains, for example, the position and the speed at the point in time t.

Analogously the system can also be described discretely at points in time $t_k$ $$X_{k+1} = f(t_k, X_k) + \sigma(t_k, X_k)W_k$$

$$Y_{k+1} = g(t_k, X_k) + v(t_k, X_k)V_k$$

with normally distributed random variables $W_k$ and $V_k$.

A number of approximation methods for non-linear filter problems are known.

Extended Kalman filters and other linearizing methods linearize the system equations and solve the linearized problem. Depending on the degree of the nonlinearities in the system, marked inaccuracies up to divergence of the filter are unavoidable.

Sampling methods such as particle filters or unscented filters consider the behavior of the system for a few suitable state vectors x, which are selected either randomly or systematically. Since realistic problems require, for example, five-dimensional to ten-dimensional state vectors, the use of some fewer system state vectors in higher dimensions leads to high inaccuracies.

An exact treatment of the problem takes place, for example, by considering the conditional density function $$p_t(x) := \frac{\partial}{\partial x} P(X_t \leq x \mid Y_s, s \leq t)$$

$P(X_t \leq x \mid Y_s, s \leq t)$ is thereby the probability that the unknown random state vector at the point in time t will adopt a value smaller than or equal to x, with given measurements up to the point in time t.

It is known that the conditional density function $p_t$ contains the complete information on the movement of the object at the time t. The optimum estimate $\hat{X}_t$ of the system state (in the sense of the minimization of the error variance) is produced, for example, as a conditional expectation, that is, by integration of the density function, $$\hat{X}_t = \int x p_t(x) dx$$

The exact determination of this density function thus solves the problem exactly. In the continuous case it can be shown that the density function fulfills the stochastic partial differential equation $$\partial p_t = \left[ \begin{array}{c} -\sum_k \frac{\partial}{\partial x_k}(f_k(t,x)p_t(x)) + \\ \frac{1}{2}\sum_{i,k} \frac{\partial^2}{\partial x_i \partial x_k}(b_{ik}(t,x)p_t(x)) \end{array} \right] dt + \frac{[g(t,x)p_t(x) - \pi_t(g(t,X_t))p_t(x)]}{\upsilon(t,x)} d\tilde{W}$$

where $b(t,x):=\sigma(t,x)\sigma(t,x)^T \cdot \pi_t(g(t,X_t))$ is thereby the estimate of the variable $g(t, X_t)$ and $\tilde{W}$ the innovation process, equations of this type are also referred to as Zakai equations.

The component $$-\sum_k \frac{\partial}{\partial x_k}(f_k(t,x)p_t(x))$$

determines the "shift" of the density function and is referred to as the advection term, the term $$\frac{1}{2}\sum_{i,k} \frac{\partial^2}{\partial x_i \partial x_k}(b_{ik}(t,x)p_t(x))$$

determines the "expansion" of the density function and is called the diffusion term. These two components are used to predict the system behavior without the use of measurements. The associated equation $$\partial p_t = \left[ -\sum_k \frac{\partial}{\partial x_k}(f_k(t,x)p_t(x)) + \frac{1}{2}\sum_{i,k} \frac{\partial^2}{\partial x_i \partial x_k}(b_{ik}(t,x)p_t(x)) \right] dt$$

is called the Fokker-Planck equation.

The last term of the stochastic partial differential equation (measurement term) describes the information gained by the use of measurements. In the discrete case, that is, in the case that measurements are available only at discrete points in time, this part of the equation corresponds to Bayes' formula. Analogous formulas thus also exist in the discrete (that is, the measurement and/or the system itself is considered only at discrete points in time) as well as in the prediction problem or in the smoothing problem.

Zhang and Laneuville (Zhang, H.; Laneuville, D.: *Grid Based Solution of Zakai Equation with Adaptive Local Refinement for Bearings-only Tracking*. IEEE Aerospace Conference 2008, p. 1-8) solve an equation of this type by numerical methods. To this end, the function $p_t$ is represented on a locally refined regular grid of nodes and the equation is discretized. Problems up to four dimensions can be processed in this manner. Since the expenditure increases exponentially with the number of dimensions, an application to higher dimensions is possible only with difficulty.

In recent years, as a new approach, so-called "sparse grids" have been introduced for the interpolation of higher-dimensional functions by Zenger [Zenger, C.: Sparse Grids, in W. Hackbusch (ed.): *Parallel Algorithms for Partial Differential Equations*. Braunschweig: Vieweg, 1991 (Notes on Numerical Fluid Mechanics 31), pages 241 to 251]. In DE 100 62 120 A 1 this approach is described in the field of financial mathematics for the valuation of financial derivatives. These grids require in d-dimensional space $O(N(\log N)^{d-1})$ points, that is, substantially less than a regular grid with $O(N^d)$ points.

SUMMARY OF THE INVENTION

The embodiments of the present invention embody a generic method that can be carried out efficiently, for example, in real time, even when taking into consideration a multiplicity of parameters, that is, with more than four-dimensional problems. According to embodiments, a device is provided for tracking the path of motion of a moving object.

According to embodiments, the method for tracking the path of motion of a moving object, such as a missile, can include:

a) Provision of data of at least one state variable to be determined, which influences the movement of the moving object, at a first point in time;

b) Initialization of the probability density (p) of the at least one state variable to be determined at the first point in time;

c) Prediction of the probability density (p) of the at least one state variable to be determined at a next point in time after the first point in time;

d) Verification of whether measurement data are available that can be used for a calculation of the probability density (p) of the at least one state variable to be determined; and d') If such data are available, new calculation of the probability density (p) with these measurement data;

e) Calculation of the prediction values of the state variable (s) to be determined from the probability density (p);

f) Output of the calculated prediction values to a downstream data processing device;

g) Repetition of the steps c) through f), wherein according to the invention the steps Of the initialization of the probability density [step b)],
Of the prediction of the probability density [step c)],
Of the new calculation of the probability density [step d')] and
Of the calculation of the prediction values [step e)]

are carried out by discretization of the probability density (p) on sparse grids.

The basic concept of the invention is therefore with the calculations for tracking the path of motion to carry out the discretizations of the probability density respectively on sparse grids, that is, for example, to solve the above-referenced stochastic partial differential equations on sparse grids.

With this method according to the invention, due to the lower complexity of the sparse grids and thus of the calculations, much shorter computing times can be achieved than for conventional grids, in particular for higher dimensions, that is, for more states of the object. This was not possible with the methods hitherto known for solving the above-referenced differential equation.

The method according to the invention and a device implementing a method of this type can be used advantageously for the cases described at the outset.

It is advantageous if the sparse grids are dimension-adapted. An individual adjustment of the sparse grid to the respective dimension and the resolution necessary there for an optimal calculation can thus be realized.

It is also advantageous if the sparse grids are locally refined. That means that the sparse grid has locally shorter distances between the grid points in one or more dimensions in a region in which a high resolution is necessary or desired. The computing capacity can thereby be bundled in a concentrated manner for the calculations in this region.

In a preferred variant of the method according to the invention, the discretization of the probability densities is carried out sequentially on sparse grids for the individual grid points. This sequential approach permits a systematic consecutive processing of the calculations.

However, it is also advantageous if the discretization of the probability densities is carried out in a parallel manner on sparse grids for the individual grid points. With suitable computer architecture, much shorter computing times can be achieved thereby. The method is thereby much quicker without reducing the quality of results, that is, without having to accept any loss of accuracy.

Another advantageous embodiment of the method according to the invention is characterized in that in step b), before the first discretization of the probability densities, data are provided, which define the number of grid points and the distances between the grid points for each dimension of the sparse grid and thus determine a sparse grid unit and that a sparse grid region having at least one sparse grid unit is defined.

Even before the start of the initialization step, a sparse grid region individually adapted to the respective problem in the dimensions (number and position of the sparse grid units) of one or more sparse grid units individually adapted in the dimensions (number of the grid points per dimension and distance between the respective grid points) can thereby be established, in order to adapt the method even better to the individual problem of the tracking of the path of motion.

It is also advantageous if the definition of a first decision variable dependent on the probability density is carried out before step c), preferably in step b), and if the following steps are carried out after step e):

e1) Verification of whether the first decision variable on a sparse grid unit is below a predetermined threshold value and e2) if this is the case, removal of the verified sparse grid unit from the sparse grid region.

This modification of the method according to the invention makes it possible to keep the sparse grid region necessary for the calculations small and thus to keep the total computing time short, since the calculations of the probability density are carried out only on locally necessary sparse grid units, and the sparse grid region can be reduced by one or more sparse grid units as necessary, that is, when the probability density function has changed or shifted due to a state change of the object.

It is also advantageous if the definition of a second decision variable dependent on the probability density is carried out before step c), preferably in step b), and if the following steps are carried out after step e) or after step e2):

e3) Verification of whether the second decision variable at a predetermined distance from an edge of the sparse grid region is above a predetermined threshold value and e4) If this is the case, expansion of the sparse grid region by at least one sparse grid unit adjoining the respective edge of the sparse grid region.

This modification of the method according to the invention also makes it possible to keep the sparse grid region necessary for the calculations small, and thus to keep the total computing time short, since the calculations are carried out only on locally necessary sparse grid units and the sparse grid region can be enlarged by one or more sparse grid units if necessary, that is, when the probability density function has changed or shifted due to a state change of the object.

It is advantageous with the two above-mentioned further developments of the method according to the invention if the decision variable is the ratio between the integral under the part of the probability density located at a predetermined distance to the edge of the sparse grid region to the integral under the entire probability density. Alternatively, for example, however, a ratio of the level of the probability density function at a location of the sparse grid region close to the edge to the absolute or local maximum level of the probability density can also be used as a decision variable.

Preferably, the data provided in step a) are determined by measurement or by estimate.

The invention also covers computer programs and computer program products for tracking the path of motion of a moving object in which the method according to the invention is implemented, as well as to data storage media on which such programs or program products are stored.

Devices for localizing and tracking moving objects (in particular missiles) that use the method according to the invention are also covered by the invention.

Embodiments of the invention are directed to a method for tracking the path of motion of a moving object. The method includes a) providing data of at least one state variable to be determined, which influences the movement of the moving object, at a first point in time; b) initializing the probability density (p) of the at least one state variable to be determined at the first point in time; c) predicting of the probability density (p) of the at least one state variable to be determined at a next point in time after the first point in time; d) verifying of whether measurement data are available that can be used for a calculation of the probability density (p) of the at least one state variable to be determined, and d') recalculating the probability density (p) with these measurement data when such data is available; e) calculating the prediction values of the state variable(s) to be determined from the probability density (p); f) outputting the calculated prediction values to a downstream data processing device; and g) repeating the steps c) through f). The steps of initializing the probability density (p) of step b); predicting the probability density (p) of step c); recalculating the probability density (p) of step d'); and calculating the prediction values of step e) are performed by discretizing the probability density (p) on sparse grids.

In accordance with embodiments, the sparse grids can be dimension-adapted.

According to other embodiments, the sparse grids may be locally refined.

In accordance with still other embodiments of the instant invention, the discretizing of the probability densities can be carried out sequentially on sparse grids for individual grid points.

According to other embodiments, the discretizing of the probability densities can be carried out in a parallel manner on sparse grids for individual grid points.

Moreover, before probability densities are first discretized, data defining a number of grid points and the distances between the grid points for each dimension of the sparse grid can be provided. In this manner, a sparse grid unit can be determined and a sparse grid region having at least one sparse grid unit can be defined. Further, before performing step c) or while performing step b), the method can further include defining a first decision variable dependent on the probability density. Still further, after performing step e), the method further comprises: e1) verifying whether the first decision variable on a sparse grid unit is below a predetermined threshold value; and e2) when the first decision variable is below the predetermined threshold, removing the verified sparse grid unit from the sparse grid region. According to further embodiments, before performing step c) or while performing step b), the method may further include defining a second decision variable dependent on the probability density. Further still, after performing step e), the method further comprises: e3)

verifying whether the second decision variable at a predetermined distance from an edge of the sparse grid region is above a predetermined threshold value; and e4) when the second decision variable is above the predetermined threshold value, expanding the sparse grid region by at least one sparse grid unit adjoining the respective edge of the sparse grid region.

According to still further embodiments of the invention, the data provided in step a) can be determined by measurement or by estimate.

Embodiments are directed to a computer program for tracking the path of motion of a moving object stored on a tangible medium and executable on a computer system to perform the above-described method.

Embodiments of the invention are directed to a computer program product with a computer program stored on a tangible medium, the computer program product for tracking the path of motion of a moving object by causing a computer to execute the above-noted method.

Embodiments of the invention are directed to a data storage medium on which the computer program of claim 14 or the computer program product of claim 15 is stored.

Embodiments of the instant invention are directed to a device for localizing and tracking moving objects, the device being structured and arranged to perform the above-described method.

Embodiments of the present invention are directed to a device for localizing and tracking the path of motion of a moving object. The device includes sparse grids, a provisioner structured and arranged to provide data of at least one state variable to be determined, which influences the movement of the moving object, at a first point in time, an initializer structured and arranged to initialize the probability density (p) of the at least one state variable to be determined at the first point in time by discretization of the probability density (p) on sparse grids, a predictor structured and arranged to predict the probability density (p) of the at least one state variable to be determined at a next point in time after the first point in time by discretization of the probability density (p) on sparse grids, a verifier structured and arranged to verify whether measurement data are available that can be used for a calculation of the probability density (p) of the at least one state variable to be determined by discretization of the probability density (p) on sparse grids, and a calculator structured and arranged to recalculate the probability density (p) with these measurement data when such data is available by discretization of the probability density (p) on sparse grids; and to calculate the prediction values of the state variable(s) to be determined from the probability density (p) by discretization of the probability density (p) on sparse grids, and an output structured and arranged to output the calculated prediction values to a downstream data processing device.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
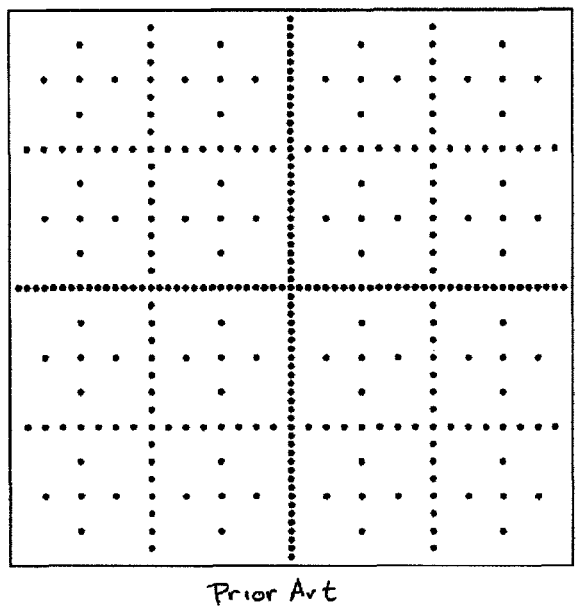
FIG. 1 illustrates an example of a two-dimensional sparse grid.

FIG. 1 shows an example of a two-dimensional sparse grid of symmetrical structure as is already generally known.

Figure 2:
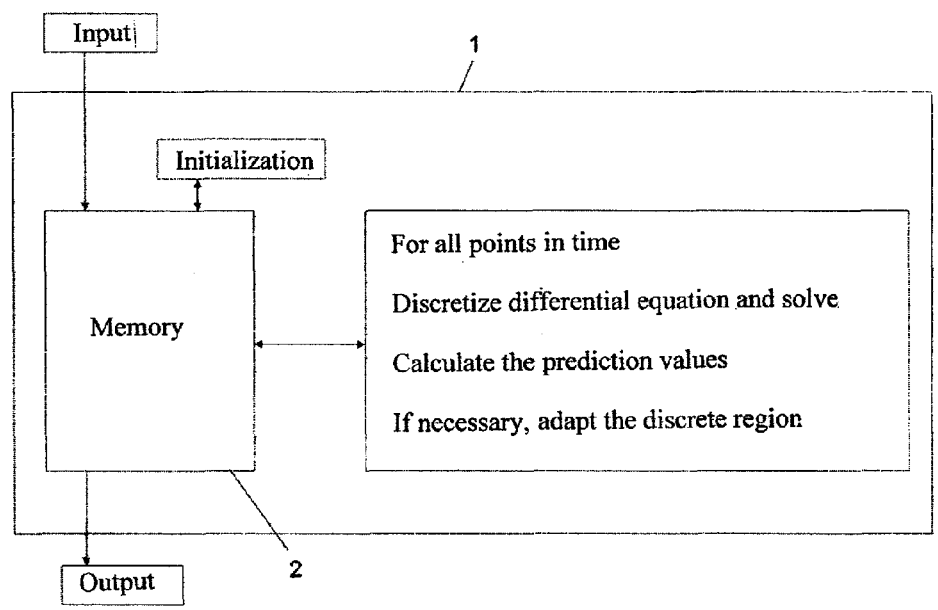
FIG. 2 illustrates a diagrammatic flow chart of the method according to the invention.

FIG. 2 shows a diagrammatic flow chart of the method according to the invention, which is described below based on this figure. The reference number 1 thereby designates diagrammatically a computer device on which the method according to the invention is implemented in software and runs.

Therefore, as will be appreciated by those ordinarily skilled in the art, the present invention may be embodied as a system, method or computer program product. Accordingly, the present invention may take the form of an entirely hardware embodiment, an entirely software embodiment (including firmware, resident software, micro-code, etc.) embodied or stored on a tangible medium or an embodiment combining software and hardware aspects that may all generally be referred to herein as a "circuit," "module" or "system." Furthermore, the present invention may take the form of, e.g., a non-transitory computer program product embodied in any tangible medium of expression having computer-usable program code embodied in the medium.

Any combination of one or more computer usable or computer readable medium(s) may be utilized (e.g., one or more tangible computer readable mediums and/or intangible computer readable mediums). The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
    an electrical connection having one or more wires,
    a portable computer diskette,
    a hard disk,
    a random access memory (RAM),
    a read-only memory (ROM),
    an erasable programmable read-only memory (EPROM or Flash memory),
    an optical fiber,
    a portable compact disc read-only memory (CD-ROM),
    an optical storage device,
    a transmission media such as those supporting the Internet or an intranet, and/or
    a magnetic storage device.

In the context of the embodiments, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Computer device 1 can be part of a system or environment for managing the processes in accordance with the embodiments. To this extent, the system or environment can include a server or even another computing system that can perform the processes described herein. By way of non-limiting example, the server can include a computing device 1, which can be resident on a network infrastructure or computing device of a third party service provider.

Computing device 1 includes one or more tools to carry out the present invention. The tools can be implemented as one or more program code in a program control stored in memory 2 as separate or combined modules.

Computing device 1 may also include a processor, memory 2, an I/O interface, and a bus. Memory 2 can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

Computing device 1 can be in communication with the external I/O device/resource and a storage system. For example, the I/O device can comprise any device that enables an individual to interact with the computing device or any device that enables the computing device 1 to communicate with one or more other computing devices using any type of communications link. The external I/O device/resource may be for example, a handheld device, PDA, handset, keyboard etc.

In general, a processor can execute computer program code (e.g., program control), which can be stored in the memory 2 and/or other storage system. Moreover, in accordance with aspects of the invention, the program control having program code controls above-noted tools. While executing the computer program code, the processor can read and/or write data to/from memory 2, other storage system, and/or I/O interface. The program code executes the processes of the invention. The bus may provide a communications link between each of the components in the computing device 1.

Computing device 1 can comprise any general purpose computing article of manufacture capable of executing computer program code installed thereon (e.g., a personal computer, server, etc.). However, it is understood that computing device 1 may only be representative of various possible equivalent-computing devices that may perform the processes described herein. To this extent, in embodiments, the functionality provided by computing device 1 can be implemented by a computing article of manufacture that includes any combination of general and/or specific purpose hardware and/or computer program code. In each embodiment, the program code and hardware can be created using standard programming and engineering techniques, respectively.

Similarly, the system or environment is only illustrative of various types of computer infrastructures for implementing the invention. For example, in embodiments, the server can include two or more computing devices (e.g., a server cluster) that communicate over any type of communications link, such as a network, a shared memory, or the like, to perform the process described herein. Further, while performing the processes described herein, one or more computing devices on the server can communicate with one or more other computing devices external to the server using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

The input data are provided and stored in a memory 2, and all necessary initializations are carried out. The prediction of the motion is respectively carried out at discrete points in time. To this end, in each time step the differential equation is discretized on the sparse grids and the resulting discrete equation is solved. Starting from the approximation of the density function $p_t$ thus calculated, a prediction of the current motion state is determined. To save on computing time, not the entire state space, but only the regions of the state space relevant in each time step are discretized. This region selection is repeatedly adapted to the current approximation of the density function.

The discretization of the differential equation is carried out by finite differences or another discretization strategy on the sparse grids. A selection can thereby be made among the different possibilities, as they are known for advection and diffusion, for example, a finite differences upwind term for the first differentiations occurring in the advection part and symmetrical finite differences for the second differentiations.

The time discretization is carried out by a Euler step, for example. In the establishment of the time step width, the stability conditions known for advection diffusion equations should be observed.

It is also possible, but not absolutely necessary, to modify the standard sparse grid in the state space, for example, by dimension-dependent refinement or local adaptive refinement strategies.

The radar measurement data are entered according to the measurement term of the differential equation at each of the sparse grid points (grid nodes) in the form of a weighting according to the Bayes formula or its continuous analogon.

The prediction of the object motion state is obtained, for example, by calculating the expectation values it $\hat{x}_t = \int x p_t(x) dx$ by integration. The calculation is hereby carried out with a numerical integration method on the sparse grids using the approximatively calculated density function.

The advection term of the differential equation, depending on concrete values of the $f_k$, can ensure that the solution of the differential equation over the entire solution period extends over a very large state region. In order to solve this problem in a manner that saves computing time, the entire possible state region is not discretized in each time step, but only the respectively currently relevant region. This is possible because the density functions are highly localized as a rule.

Figure 3:
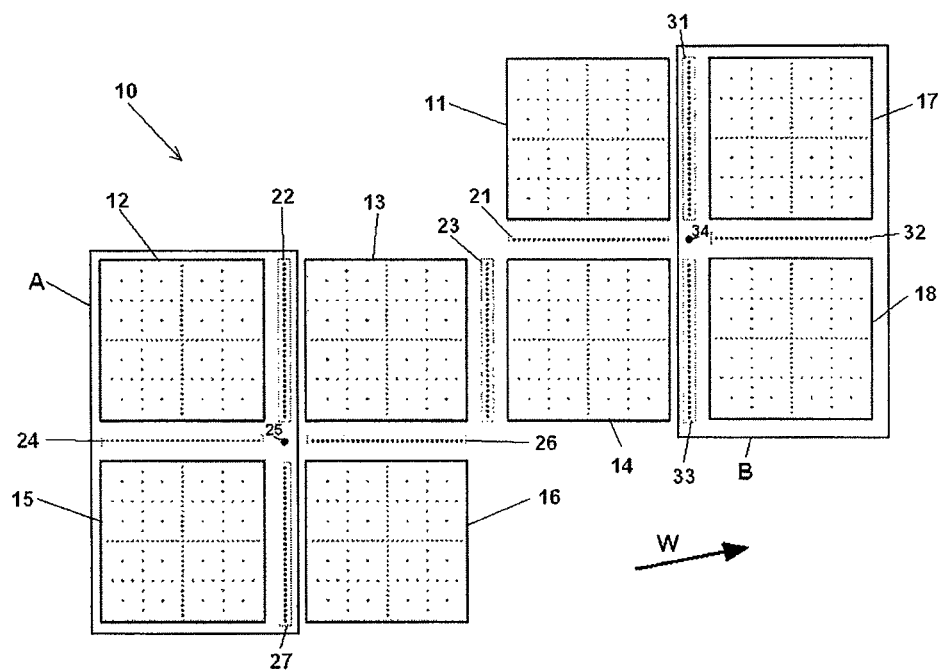
FIG. 3 illustrates an example of a tiling of sparse grid units to form a sparse grid region.

The relevant region 10, as is shown in FIG. 3, is covered by individual sparse grids, so-called sparse grid units 11, 12, 13, 14, 15, 16, which are connected via grid supplemental points 21, 22, 23, 24, 25, 26, 27 correspondingly adapted at their edges and corners, to a sparse grid region 10. If the region of the essential information now shifts over time in the state space (that is, on the sparse grid region 10), wherever it is necessary, further sparse grid units will be applied by correspondingly adapted grid supplemental points in order to discretize this region, and at those points of the sparse grid region 10 at which there is no longer any relevant information, the superfluous sparse grid units will be removed. The grid supplemental points, which are zero-dimensional, one-dimensional or multi-dimensional, in this manner form connection points or "adhesion points" between the sparse grid units. The sparse grid region 10 is thus assembled in a tiled manner from sparse grid units 11, 12, 13, 14, 15, 16 and, as necessary, expanded or reduced by individual sparse grid units ("tiles"). An example of a "tiling" of this type for the two-dimensional space can be seen in FIG. 3.

FIG. 3 symbolically shows this type of shift of the region of the essential information by the arrow W. This shift movement means that in the upper right region of the sparse grid region 10 two new "tiles," i.e., the sparse grid regions 17 and 18, are added to the sparse grid region 10 by the necessary grid supplemental points 31, 32, 33, 34 as a new partial region B.

The information density in the lower left part of the sparse grid region 10 is reduced by the shift movement W, so that this partial region A with the two sparse grid units 12 and 15 as well as the grid supplemental points 22, 24, 25 and 27 assigned thereto can be cut off, that is, can be removed from the sparse grid region 10.

The sparse grid region 10 in this manner shifts with the region of the essential information.

The terms sparse grid region, sparse grid unit and tiling are not limited to two-dimensional embodiments, but are marked in a multi-dimensional manner according to the number of the state variables to be determined.

An additional reduction in computing time can be achieved by parallelization of the methods. Thus in a pure finite differences approach, the solution of the advection diffusion part of the differential equation is possible in a parallel manner at the individual grid points (grid nodes), just as in the measurement update according to the Bayes formula. Regardless of the discretization, the different density functions occurring with the use of maneuver change detection can be processed in a parallel manner.

In all, with this approach, due to the lower complexity of the sparse grids, much shorter computing times can be achieved than for conventional grids, in particular for higher dimensions, that is, for a multiplicity of state variables to be determined. This was not possible with the methods previously known for solving the differential equation referenced at the outset.

A device has been created according to the above description, which for a six-dimensional state space with the aid of the sparse grid technique implementing the method according to the invention carries out the prediction of a missile motion with given radar measurement data. For example, an object motion of 20 s is simulated. The simulation time was less than 10 s.

In contrast thereto we refer to the prior art (Zhang, H.; Laneuville, D.: *Approximation of Zakai equation by grid based method*. Vortragsfolien, Workshop on Multi-target tracking, Bordeaux, France, 13.-15. Mai 2009, www.math.u-bordeaux.fr) where with a conventional approach based on regular, locally refined grids for an object motion over 800 s with only 4 state variables a simulation time of 3 h is given.

Figure 4A:
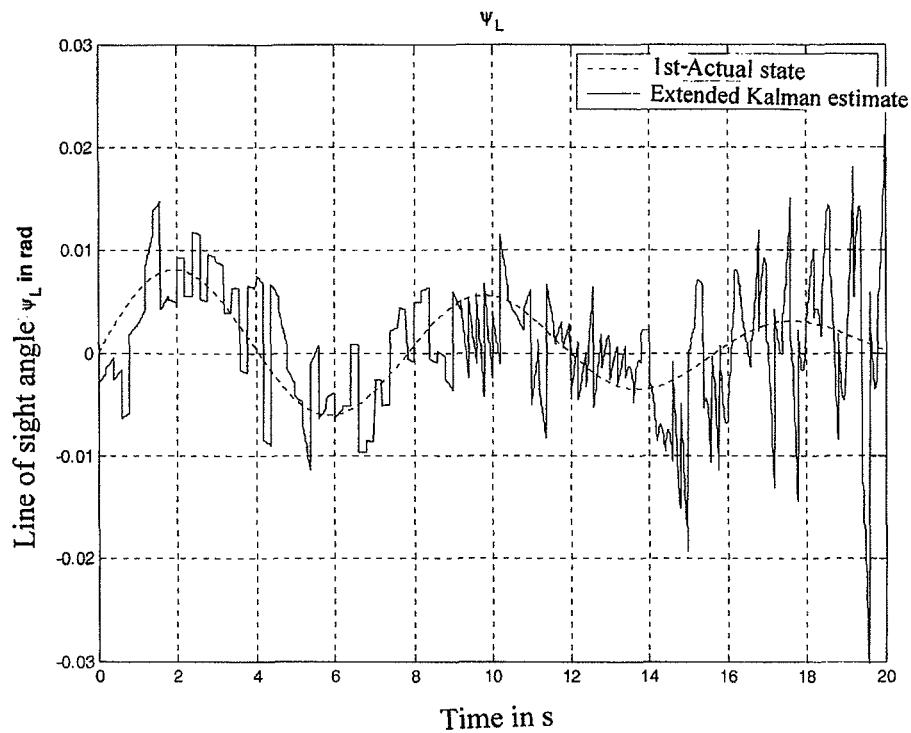
FIG. 4*a* represents a real actual state of an azimuth line of sight angle and an extended Kalman estimate of the azimuth line of sight angle.

FIG. 4*a* shows the prediction of the azimuth elevation angle by an extended Kalman filter compared to the true value.

Figure 4B:
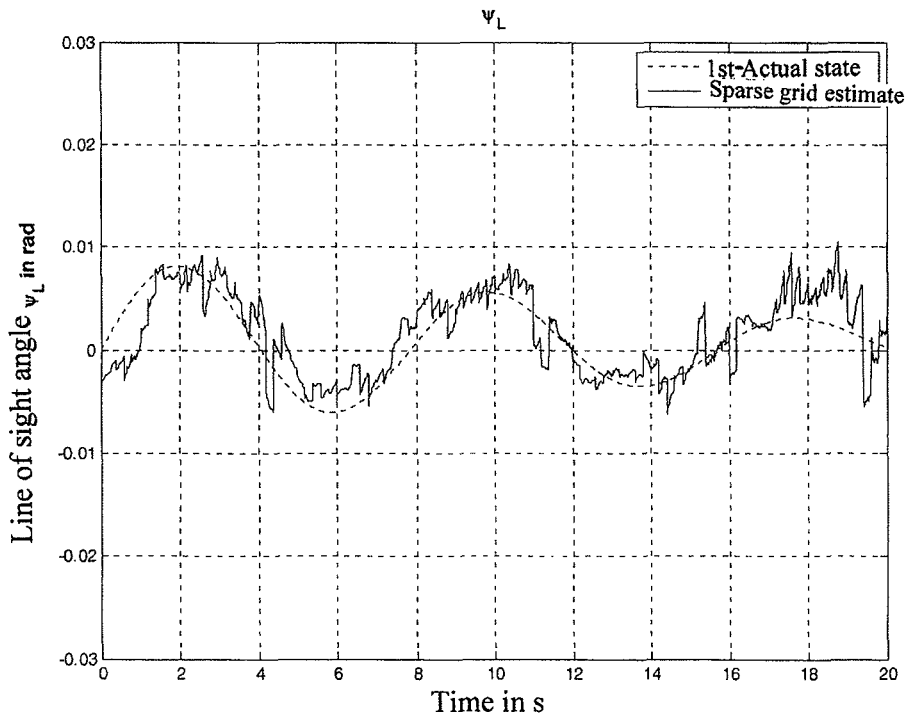
FIG. 4*b* represents a real actual state of an azimuth line of sight angle and a sparse grid estimate of the azimuth line of sight angle.

FIG. 4*b* shows the prediction of the azimuth elevation angle through the new sparse grid estimate applying the method according to the invention compared to the true value.

It is discernible that the result of the prediction with the method according to the invention in FIG. 4*b* lies much closer to the curve of the actual state than the prediction by the extended Kalman filter according to FIG. 4*a* and thus is much more accurate.

In practice, the invention deals, for example, with a device and a method for predicting movements of objects by radar measurements with the aid of sparse grids, wherein the stochastic partial differential equation to be solved is discretized and solved on sparse grids (standard grids or dimension-adapted grids or locally refined grids).

Another example of the invention relates to a device and a method for predicting movements of objects by radar measurements with the aid of sparse grids, wherein the prediction values of interest of the motion are calculated from the density function approximated on sparse grids.

Another example of the invention relates to a device and a method for predicting motions of objects by radar measurements with the aid of sparse grids, wherein the density function is approximated locally on a "tiling" of sparse grids forming sparse grid units and this lining up, forming a sparse grid region, of individual sparse grids according to the movement of the relevant regions can change in terms of time.

Finally, an advantageous embodiment of the invention comprises a device and a method for predicting movements of objects by radar measurements with the aid of sparse grids, wherein the individual calculation steps are processed in a parallel manner on sparse grids.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

1 Computer device
2 Memory
10 Sparse grid region
11 Sparse grid unit 12 Sparse grid unit
13 Sparse grid unit
14 Sparse grid unit
15 Sparse grid unit
16 Sparse grid unit
17 Sparse grid unit
18 Sparse grid unit
21 Grid supplemental point
22 Grid supplemental point
23 Grid supplemental point
24 Grid supplemental point
25 Grid supplemental point
26 Grid supplemental point
27 Grid supplemental point
31 Grid supplemental point
32 Grid supplemental point
33 Grid supplemental point
34 Grid supplemental point

What is claimed:

1. A method for tracking the path of motion of a moving object having a position, speed vector, ballistic coefficient or other state variable that defines a current property of the motion of the moving object, comprising:
   a) providing data of at least one state variable to be determined, which influences the movement of the moving object, at a first point in time;
   b) initializing the probability density (p) of the at least one state variable to be determined at the first point in time;
   c) predicting the probability density (p) of the at least one state variable to be determined at a next point in time after the first point in time;
   d) verifying whether measurement data are available for calculation of the probability density (p) of the at least one state variable to be determined;
   d') recalculating the probability density (p) with these measurement data when such data is available;
   e) calculating the prediction values of the state variable(s) to be determined from the probability density (p);
   f) outputting the calculated prediction values to a downstream data processing device to determine at least one future location based on the calculated prediction values; and
   g) repeating the steps c) through f),
   wherein the:
      initializing of the probability density (p) of step b);
      predicting of the probability density (p) of step c),
      recalculating of the probability density (p) of step d'); and
      calculating of the prediction values of step e)
   are performed by discretizing the probability density (p) on sparse grids.

2. The method in accordance with claim 1, wherein the sparse grids are dimension-adapted.

3. The method in accordance with claim 1, wherein the sparse grids are locally refined.

4. The method in accordance with claim 1, wherein the discretizing of the probability densities is carried out sequentially on sparse grids for individual grid points.

5. The method in accordance with claim 1, wherein the discretizing of the probability densities is carried out in a parallel manner on sparse grids for individual grid points.

6. The method in accordance with claim 1, wherein, before probability densities are first discretized, data defining a number of grid points and the distances between the grid points for each dimension of the sparse grid is provided, whereby a sparse grid unit is determined and a sparse grid region having at least one sparse grid unit is defined.

7. The method in accordance with claim 6, wherein, before performing step c), the method further comprises defining a first decision variable dependent on the probability density.

8. The method in accordance with claim 6, wherein, while performing step b), the method further comprises defining a first decision variable dependent on the probability density.

9. The method in accordance with claim 6, wherein, after performing step e), the method further comprises:
   e1) verifying whether the first decision variable on a sparse grid unit is below a predetermined threshold value; and
   e2) when the first decision variable is below the predetermined threshold, removing the verified sparse grid unit from the sparse grid region.

10. The method in accordance with claim 6, wherein, before performing step c), the method further comprises defining a second decision variable dependent on the probability density.

11. The method in accordance with claim 6, wherein, while performing step b), the method further comprises defining a second decision variable dependent on the probability density.

12. The method in accordance with claim 6, wherein, after performing step e), the method further comprises:
   e3) verifying whether the second decision variable at a predetermined distance from an edge of the sparse grid region is above a predetermined threshold value; and
   e4) when the second decision variable is above the predetermined threshold value, expanding the sparse grid region by at least one sparse grid unit adjoining the respective edge of the sparse grid region.

13. The method in accordance with claim 1, wherein the data provided in step a) are determined by measurement or by estimate.

14. A non-transitory computer readable medium having stored thereon a computer program executable on a computer system for tracking the path of motion of a moving object by performing the method in accordance with claim 1.

15. A device for localizing and tracking moving objects, the device being structured and arranged to perform the method in accordance with claim 1.

16. A device for localizing and tracking the path of motion of a moving object having a position, speed vector, ballistic coefficient or other state variable that defines a current property of the motion of the moving object, comprising:
   sparse grids;
   a provisioner structured and arranged to provide data of at least one state variable to be determined, which influences the movement of the moving object, at a first point in time;
   an initializer structured and arranged to initialize the probability density (p) of the at least one state variable to be determined at the first point in time by discretization of the probability density (p) on the sparse grids;
   a predictor structured and arranged to predict the probability density (p) of the at least one state variable to be determined at a next point in time after the first point in time by discretization of the probability density (p) on the sparse grids;
   a verifier structured and arranged to verify whether measurement data are available that can be used for a calculation of the probability density (p) of the at least one state variable to be determined by discretization of the probability density (p) on the sparse grids;
   a calculator structured and arranged to recalculate the probability density (p) with these measurement data when such data is available by discretization of the probability density (p) on the sparse grids and to calculate the prediction values of the state variable(s) to be determined from the probability density (p) by discretization of the probability density (p) on the sparse grids; and an output structured and arranged to output the calculated prediction values to a downstream data processing device to determine at least one future location based on the calculated prediction values.

\* \* \* \* \*